United States Patent [19]

Koblasz et al.

[11] Patent Number: 4,559,979
[45] Date of Patent: Dec. 24, 1985

[54] ULTRASOUND LEVEL DETECTOR

[75] Inventors: Arthur Koblasz, Cumming, Ga.; James Hollister, Manchester, Conn.; Douglas Alexander, Marietta, Ga.

[73] Assignee: The Coca-Cola Company, Atlanta, Ga.

[21] Appl. No.: 559,288

[22] Filed: Dec. 8, 1983

[51] Int. Cl.$^4$ .............................................. B65B 3/04
[52] U.S. Cl. .......................................... 141/9; 141/11; 141/95; 141/102; 141/198; 141/361
[58] Field of Search ....................... 141/1–12, 141/82, 83, 94, 95, 96, 192–229, 360, 361, 362, 100–110

[56] References Cited

U.S. PATENT DOCUMENTS

| | | | |
|---|---|---|---|
| 3,814,146 | 6/1974 | Mesh | 141/1 |
| 3,847,016 | 11/1974 | Ziedonis | 73/67.7 |
| 4,083,387 | 4/1978 | Stieber et al. | 141/95 |
| 4,437,497 | 3/1984 | Enander | 141/198 |
| 4,458,735 | 7/1984 | Houman | 141/198 |
| 4,469,150 | 9/1984 | Grimaldi | 141/198 |

Primary Examiner—Houston S. Bell, Jr.
Attorney, Agent, or Firm—Birch, Stewart, Kolasch & Birch

[57] ABSTRACT

An ultrasound liquid level detector system for automatically controlling the dispensing of a post-mix beverage, including microprocessor-controlled circuitry for monitoring and implementing the automatic dispensing process. The microprocessor is interfaced with an ultrasonic transducer which transmits ultrasonic wave energy towards the container to be filled and receives reflected ultrasonic wave energy, the characteristics of which are analyzed within the microprocessor to implement control functions of the automatic dispensing process. Dispensing is initially stopped before the liquid level reaches the top of the container to allow for dissipation of foam on the top of a carbonated beverage and dispensing is reinitiated to top off the level of beverage adjacent the top of the container. The disclosed system also utilizes the ultrasonic transducer to measure the level of ice within the container prior to dispensing and precludes dispensing of the beverage if the level of ice exceeds a predetermined limit. The system also has additional safeguards programmed into the microprocessor to preclude operator errors such as triggering of the dispenser system by devices other than the container to be filled.

14 Claims, 16 Drawing Figures

ULTRASOUND LEVEL DETECTOR

BACKGROUND OF THE INVENTION

The present invention relates to an apparatus for automatically filling a container with a post-mix carbonated beverage. More specifically, the present invention relates to an ultrasonic level detector for automatically controlling the filling of a container with a carbonated beverage which tends to form a head of foam thereon during the filling operation.

Heretofore, attempts have been made to provide apparatus which automatically fill beverage containers such as cups in response to the proper positioning of a cup under a beverage dispenser and then terminate the dispensing operation when a proper liquid level within the cup is achieved. The liquid level detector devices in these prior are systems generally utilize electrical probes such as conductive or capacitive probes to determine liquid level.

There are also known systems for measuring liquid level within containers utilizing ultrasonic transducers and associated detector circuitry. However, none of these appear to have been implemented for controlling the automatic filling operation of carbonated beverage cups.

The use of ultrasound has definite potential advantages for the purposes of controlling an automatic filling operation of beverage cups in that the ultrasonic transducer may be utilized both for initiating the filling operation in response to detecting the presence of a cup and continuously monitoring the liquid level within the cup during the filling operation until a predetermined liquid level is achieved. Both of these functions can be achieved by mounting an ultrasonic transducer adjacent to a dispensing nozzle of the post-mix beverage dispenser without cluttering the area of the dispensing machine adjacent to the working area where the cup is to be disposed.

SUMMARY OF THE INVENTION

Accordingly, it is a primary object of the present invention to provide an automatic cup-filling apparatus utilizing an ultrasonic transducer for detecting the presence of a cup and automatically controlling the filling thereof to a proper height.

It is a further object of the present inention to provide a fully automatic cup-filling machine for post-mix beverage dispensers which dispenses uniform quantities of beverage for each serving.

It is another object of the present invention to provide a system for accurately filling cups to a position adjacent the top lip even when foaming of the carbonated beverage occurs, to create a head of foam thereon.

It is still another object of the present invention to provide an automatic cup-filling apparatus for a post-mix beverage dispenser which measures the level of ice in the cup before the filling operation begins and precludes the automatic filling thereof if the level of ice exceeds a predetermined limit.

It is still a further object of the present invention to provide an automatic cup-filling apparatus including an ultrasonic transducer which accurately determines the presence of a cup under a dispenser nozzle and avoids accidental triggering of the apparatus by objects other than cups.

It is yet another object of the present invention to provide an automatic cup-filling operation which initiates the filling cycle in response to the manual insertion of a cup into a proper position under a dispensing nozzle.

It is another object of the present invention to provide suitable detector circuitry for precluding the ringing of signals reflected from the cup to assure accurate implementation of control functions in response to the reflected signals.

It is still a further object of the present invention to provide an automatic cup-filling apparatus utilizing an ultrasonic transducer in conjunction with a microprocessor programmed to implement the desired control functions.

The objects of the present invention are fulfilled by providing an apparatus for automatically filling a container with a carbonated beverage which tends to form a head of foam during the filling thereof including:

a dispenser nozzle for directing the flow of carbonated beverage into an opening in the top of the container or cup to be filled, the opening being defined by a surrounding lip;

valve means for initiating the flow of the carbonated beverage to the dispenser nozzle when open and stopping the flow thereto when closed;

detector means for measuring the level of carbonated beverage in the container being filled;

a first control means responsive to said detector means for closing said valve means to stop the flow of carbonated beverage to said dispenser outlet when said carbonated beverage reaches a predetermined level in the container;

means for opening said valve means to reinitiate the flow of said carbonated beverage if said level of beverage subsides following the closing of said valve means by said first control means by more than a predetermined distance caused by dissipation of the head of foam; and second control means for closing said valve means when said level reaches a predetermined distance from said container lip.

The liquid level detecting functions are performed by an ultrasonic transducer and associated transceiver circuitry and the control functions are implemented by a programmed microprocessor such as a Motorola MC6801. However, it should be understood that the control operations of the present invention could be implemented with discrete logic circuits and components configured to perform the control functions of the present invention instead of utilizing a programmed microprocessor.

The opening of the dispenser valve and, therefore, the initiation of the filling operation, in accordance with the present invention is triggered by the proper positioning of a cup to be filled under a dispenser nozzle which has an ultrasonic transducer disposed adjacent to the nozzle. The ultrasonic transducer transmits ultrasonic pulses toward the cup to be filled and ultrasonic wave energy is reflected from the cup lip, the cup interior, and support tray on which the cup is supported to provide the necessary data with respect to cup presence, position, and the level of liquid or ice therein. The presence of a cup is determined by detecting the same lip signal for a series of lip level signals such as for 3 out of 4 pulses in the series, and initiation of a cup-filling operation is not permitted unless this occurs. The identity of reflected signals is determined by the time of their occurrence, as compared to a pulse transmitted from the ultrasonic transducer. For example, a reflected signal from the cup lip reaches the transducer much faster than a signal reflected from the bottom of a cup. Accordingly, these signals are spaced in time along a time axis referenced to ultrasonic pulses transmitted from the transducer, and can be identified accordingly. Likewise, a signal reflected from the top of a quantity of ice in a container can be analyzed on such a time axis to determine the level of ice in the cup being filled. In accordance with the present invention, filling of the cup is precluded if the level of ice exceeds a predetermined limit prior to the initiation of the filling operation.

Since it is desirable in accordance with the present invention to fill each cup as close to the lip of the cup as possible, it has been found that some ringing or overlap occurs between the ultrasonic signal reflected from the cup lip and the surface of the beverage as it approaches the position of the cup lip. Accordingly, the present invention provides suitable detector curcuitry to detect the trailing edge of the lip signal and the trailing edge of the liquid level signal to avoid this ringing or overlap problem. Since a detectable trailing edge of a cup lip signal disappears when overlap occurs with a liquid level signal, the absence of the trailing edge of the lip signal is used to indicate that the liquid level has reached the cup lip.

BRIEF DESCRIPTION OF THE DRAWINGS

The objects of the present invention and the attendant advantages thereof will become more readily apparent with reference to the following description of the drawings wherein like numerals refer to like parts and.

DETAILED DESCRIPTION OF THE DRAWINGS

Figure 1:
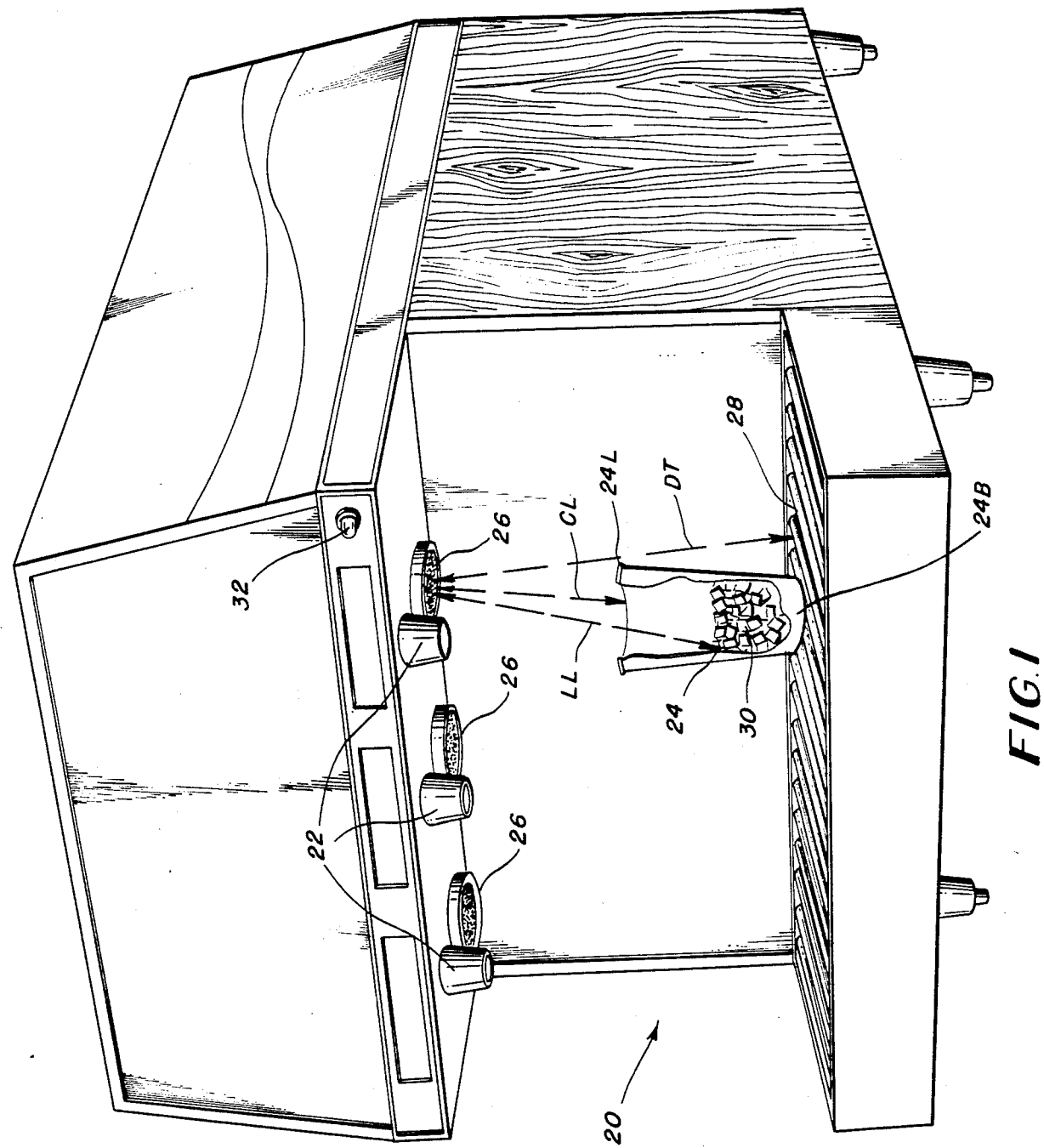
FIG. 1 is a perspective view of a post-mix beverage dispenser cabinet including ultrasonic transducers associated with each dispensing nozzle and a cup to be filled disposed beneath one of the nozzles to illustrate the interaction of the ultrasonic energy of the transducer and the associated cup.

Referring to FIG. 1, there is illustrated in front perspective a post-mix beverage dispenser apparatus generally indicated 20. The particular dispenser apparatus illustrated includes three dispensing nozzles 22 for dispensing three different types or flavors of soft drink beverages. Each of the dispenser nozzles 22 has an ultrasonic transducer 26 mounted directly to the rear thereof on the overhang provided by the upper portion of the dispenser cabinet. Directly below the dispenser nozzles 22 and the ultrasonic transducers 26 is a conventional drip tray or grate 28 for supporting a cup to be filled such as a paper or plastic cup 24 having a lip 24L surrounding an opening in the top thereof and a bottom 24B. As illustrated in FIG. 1, ultrasonic wave energy is transmitted from ultrasonic transducer 26 toward the cup 24 and reflects from the interior of the cup, the cup lip 24L and the drip tray surface 28, back to the ultrasonic transducer 26 wherein it is processed in a transceiver circuit to be described hereinafter in connection with FIG. 2. The ultrasonic signal reflected form the interior of the cup either reflects from the bottom of the cup or from the contents of the cup, which may be either ice or liquid, depending on the point within the automatic filling cycle, and is labeled LL. The ultrasonic signal reflected from the cup lip 24L is labeled CL, and the ultrasonic signal reflected from the drip tray or grate 28 is labeled DT.

The cabinet of the post-mix beverage dispenser 20 of FIG. 1 is also provided on the front surface thereof with an indicator light 32 which is illuminated when an operator attempts to fill a cup having an excess of a predetermined limit of ice. The cabinet of the post-mix beverage dispenser 20 also houses the necessary syrup packages, carbonator and control circuitry for operating dispenser valves which are in operative association with each of the dispenser nozzles 22. These dispenser valves may be of any type conventional in the art which are, for example, electrically actuated and initiate the flow of liquid out of dispenser nozzles 22 when open and stop the flow of fluid out of those nozzles when closed. These valves are opened and closed in response to signals from the microprocessor 34 of the system of FIG. 2, to be described hereinafter.

Figure 2:
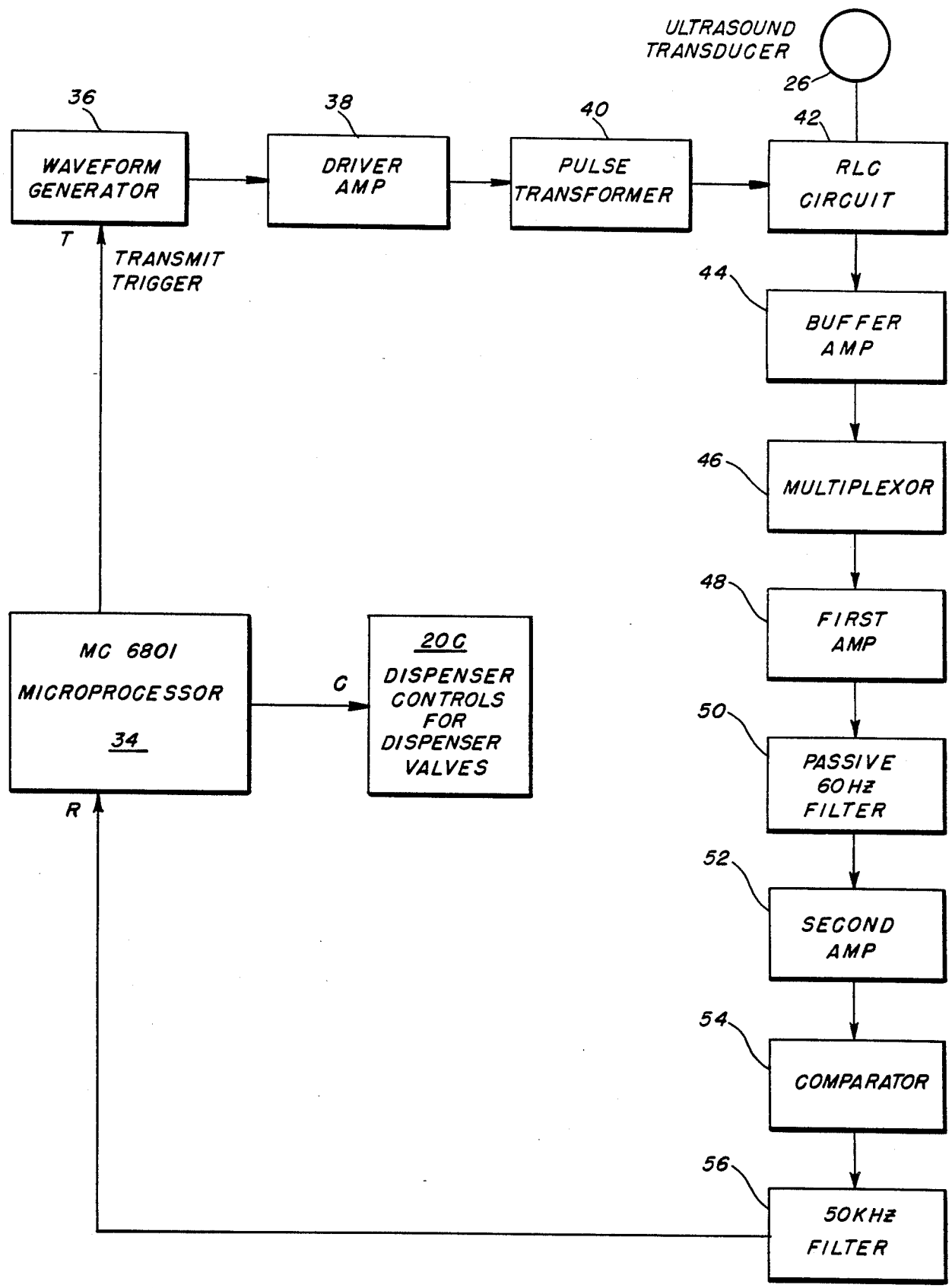
FIG. 2 is a schematic block diagram of the transceiver circuitry for the ultrasonic transducer of the present invention in combination with a microprocessor interacting with the transceiver circuitry and the dispenser controls of the post-mix beverage dispenser of FIG. 1.

Referring now to FIG. 2, there is illustrated a block diagram of the automatic filling apparatus of the present invention, including a microprocessor 34 which may be a Motorola MC6801. The microprocessor 34 transmits trigger signals along bus line T to the transceiver driver circuit of the ultrasound transducer 26 and receives processed electrical signals from the reflected ultrasonic energy measured by ultrasound transducer 26 via line R. The reflected signals received along bus line R are processed within microprocessor 34 in accordance with program logic functions in order to generate control signals along bus line C to operate the dispenser controls 20C within the post-mix beverage dispenser 20 of FIG. 1. As stated hereinbefore, the dispenser controls include valves associated with each of the dispenser nozzles 22 for starting and stopping the flow of beverage from those nozzles into an associated cup to be filled.

The drive circuitry for the ultrasound transducer 26 includes a waveform generator 36, a driver amplifier 38, a pulse transformer 40 and a tuned RLC circuit 42. This drive circuitry is triggered to generate ultrasonic pulses from transducer 26, directed toward the cup 24 in FIG. 1. The driver section of the transceiver circuit illustrated in FIG. 2 supplies a sinusoidal 50 KHz, 220 volt burst with a 150 volt D.C. bias to the transducer when triggered by a signal from bus line T from the microprocessor 34.

Signals reflected from the lip of the cup 24L, the interior of the cup and the drip tray 28, illustrated as CL, LL, and DT, respectively, in FIG. 1, are amplified and processed to produce TTL (Transistor-Transistor-Logic) level pulse trains where each pulse represents reflected ultrasonic waves by the portion of the transceiver circuitry of FIG. 2, including a buffer amplifier 44, a multiplexer 46, a first amplifier 48, a passive 60 Hz filter 50, a second amplifier 52, a comparator 54, and a 50 KHz filter 56.

Figure 3:
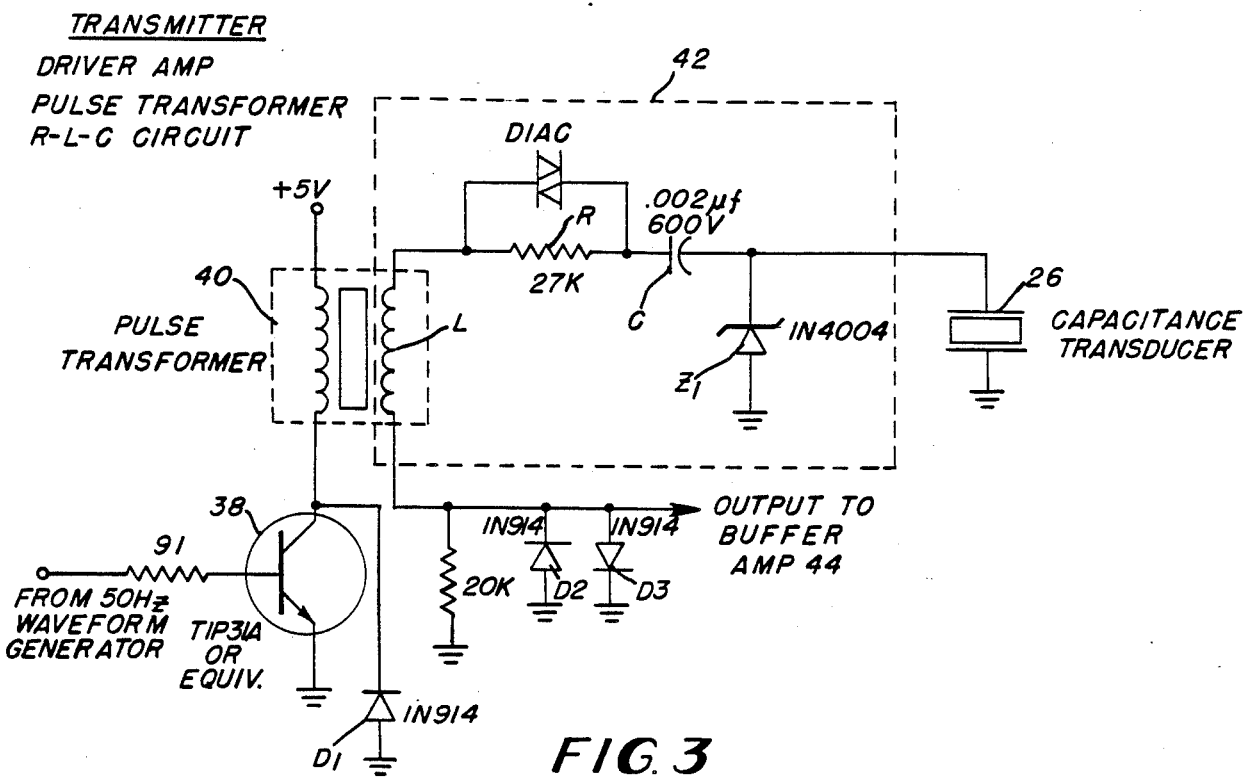
FIG. 3 is a circuit diagram illustrating the details of the blocks 38, 40 and 42 of the block diagram of FIG. 2.

Referring to FIG. 3, there is illustrated a detailed circuit diagram for the driver amplifier 38 and pulse transformer 40 of FIG. 2. As illustrated, the driver amplifier 38 may comprise a conventional NPN transistor 38 having its base connected to the output of waveform generator 36, comprising an oscillator with a 50 KHz output. The collector of the driver amplifier 38 is connected to a pulse transformer circuit 40, which is coupled within an RLC tuned circuit 42. The collector is also coupled to ground through a protective diode D1, which protects driver amplifier 38 from inductive overvoltages caused by switching the pulse transformer 40. The tuned circuit 42 is conventional in the ultrasonic transducer art and provides coupling between both the driving and signal processing portions of the ultrasonic transceiver circuit. That is, it serves as a coupling network between outputs from the pulse transformer 40 and reflected signals detected by ultrasonic transducer 26, which are output through inductor L and a suitable rectifier including diodes D2, D3 to buffer amplifier 44, as illustrated in FIG. 3. The waveform generator 36 may be any commercially available, single-chip oscillator which generates three cycles of a 50 KHz TTL level signal when triggered along line T by the microprocessor 34 of FIG. 2. The pulse transformer 40 transforms a 5 volt input signal from the waveform generator 36 and driver amplifier 38 into a 220 Volt signal, suitable for driving the ultrasonic transducer. The RLC tuned resonant circuit, including elements R, L and C, has a very high q so that it effectively drives the transducer 26 and couples detected signals to the signal-processing portion of the transceiver circuit. A 320 volt Zener diode Z1 protects transducer 26 from overvoltage. The circuit of FIG. 3 has been designed to minimize electrical "ringing", while still providing adequate signal-to-noise ratios.

Figure 4:
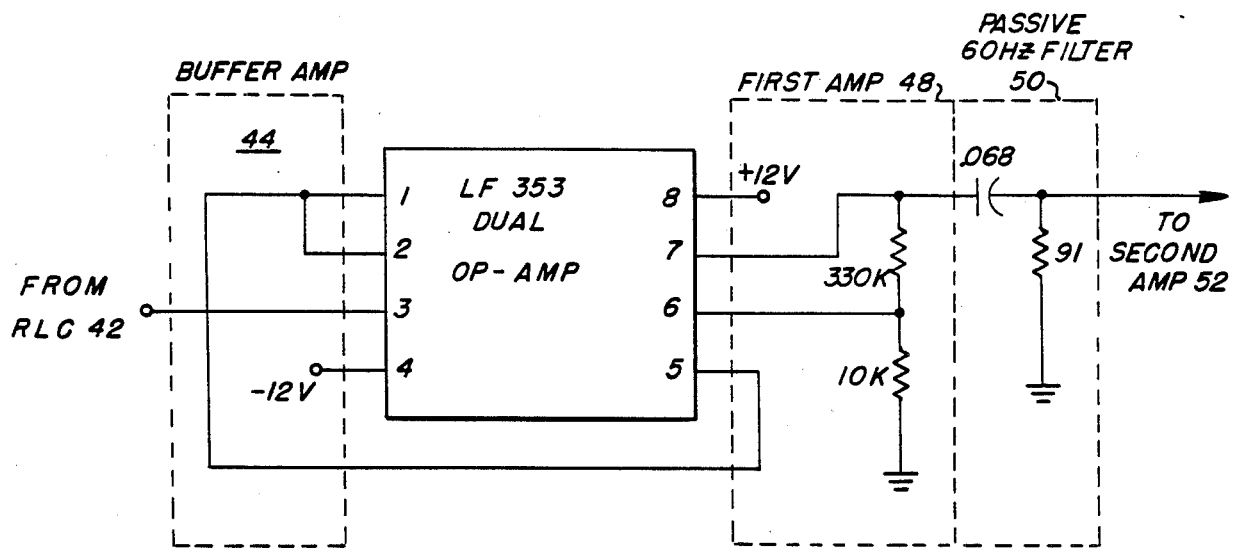
FIG. 4 illustrates a circuit diagram of the details of the blocks 44, 48, and 50 of the block diagram of FIG. 3.
Figure 5:
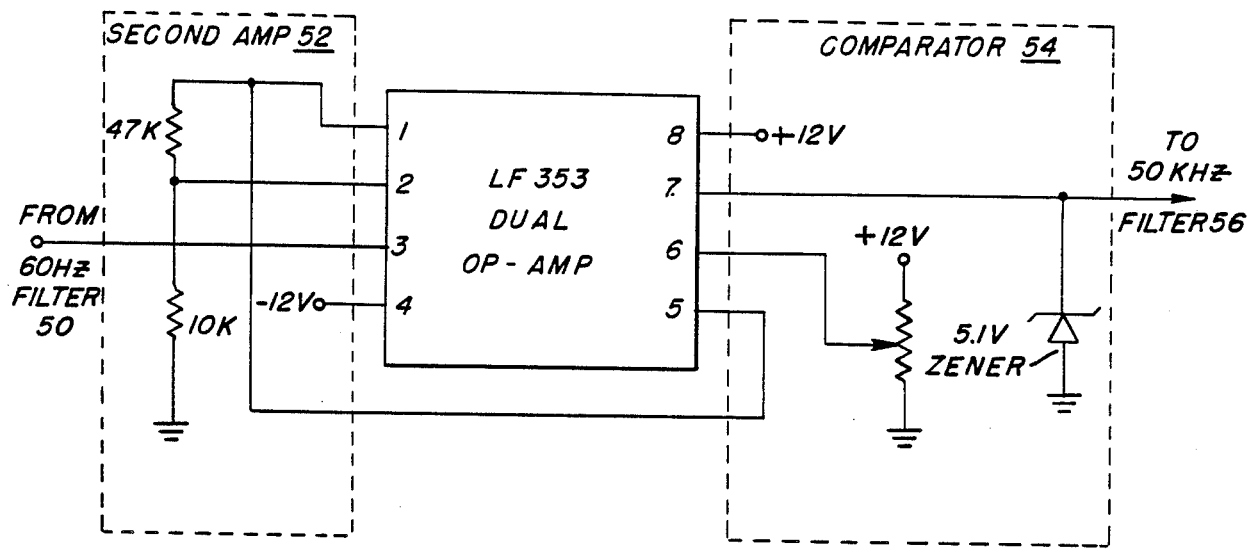
FIG. 5 is a circuit diagram illustrating the details of the blocks 52 and 54 of the block diagram of FIG. 2.

Referring to FIG. 4, there is illustrated a circuit diagram for the buffer amplifier 44, the first amplifier 48 and the 60 Hz passive filter 50 of FIG. 2. This circuit is implemented with a commercially available integrated circuit chip which is a dual OP-Amp, Model Number LF353, manufactured by National Semiconductor. The terminal pins illustrated in FIG. 4 bear the commercial pin numbers provided on the manufacturer's data sheet and are numbered 1 to 8. This dual OP-Amp configuration implements the combined functions of the buffer amplifier 44 and 48 illustrated in FIG. 2. Thas is, the buffer amplifier should have a unity gain in order to preserve the high q of the RLC circuit 42, and the first amp 48 in conjunction with a second amp 52 illustrated in FIG. 5 are used to transform the small reflected ultrasonic signals (10 mV) into TTL (Transistor-Transistor-Logic) levels (5 volts). The passive 60 Hz filter 50 is a simple RC filter used to eliminate stray 60 Hz power line noise from the amplified signals output from the first amplifier 48. It should be understood that the multiplexer 46 of FIG. 2 may be interposed between the buffer amplifier 34 and the first amplifier 48, as illustrated in FIG. 2, but since FIG. 4 only shows one signal path for one transducer, the multiplexer 46 is eliminated for clarity.

Referring to FIG. 5, there is illustrated a detailed circuit diagram of the second amp 52 of FIG. 2 and the comparator 54 thereof. The functions of these elements are implemented again by a dual OP-Amp, commercially-available, integrated circuit chip LF353 manufactured by National Semiconductor and the commercial pin numbers 1 to 8 are illustrated in FIG. 5. The 5.1 volt Zener diode clamps the output of comparator 54 to a TTL compatible level.

Figure 6:
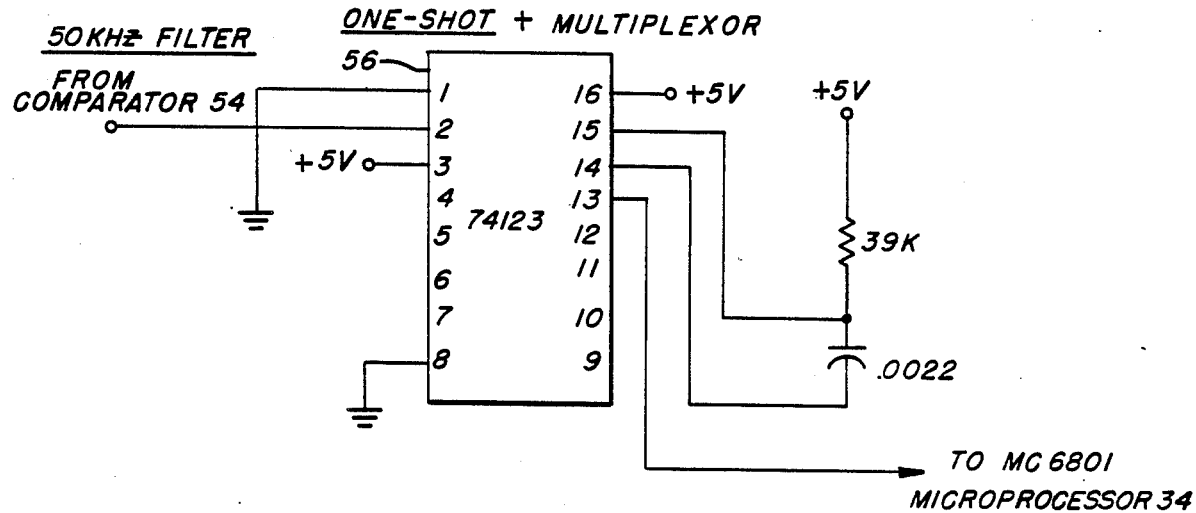
FIG. 6 is a detailed circuit diagram of the block 56 from the block diagram of FIG. 2.
Figure 7:
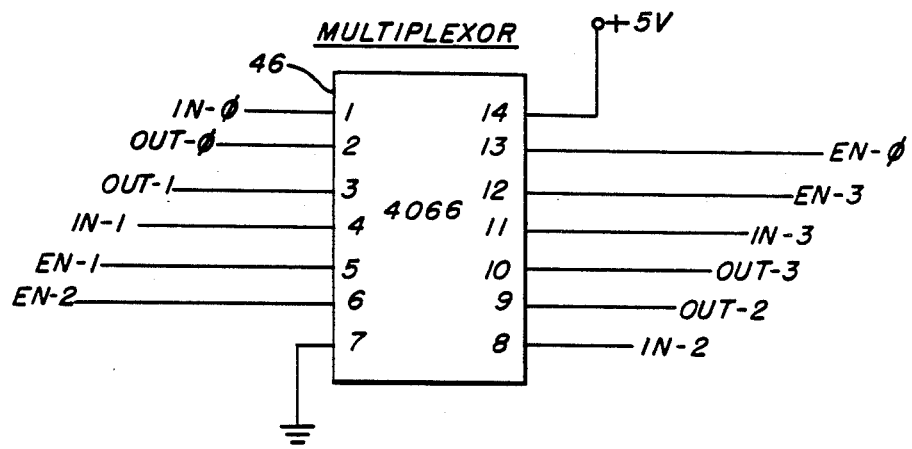
FIG. 7 illustrates one example of a suitable multiplexer to be used as element 46 in the block diagram of FIG. 2 if a plurality of dispensing nozzles and associated ultrasonic transducers are to be utilized as illustrated in the apparatus of FIG. 1;.

Referring to FIG. 6, there is illustrated a detailed circuit diagram of the 50 KHz filter 56 of the block diagram of FIG. 2. This filter may be a type 74LS123 retriggerable one-shot circuit manufactured by Texas Instruments. The function of this filter is to remove any trace of the original 50 KHz frequency generated by the waveform generator 36. The input of this filter, as illustrated in FIG. 2, is connected to the output of the comparator 54 and the output is connected to the microprocessor 34 through bus line R. Referring to FIG. 7, there is illustrated a multiplexer 46, suitable for use in the block diagram of FIG. 7, which may be a commercially-available IC chip, Model Number 4066, manufactured by National Semiconductor. As illustrated, this multiplexer may receive up to six inputs along commercial pin numbers 1 to 6 and output signal along terminals connected to commercial pin numbers 8 to 14 in a time share multiplex fashion, for operating up to six dispenser valves and associated nozzles.

DESCRIPTION OF OPERATION

Figure 8:
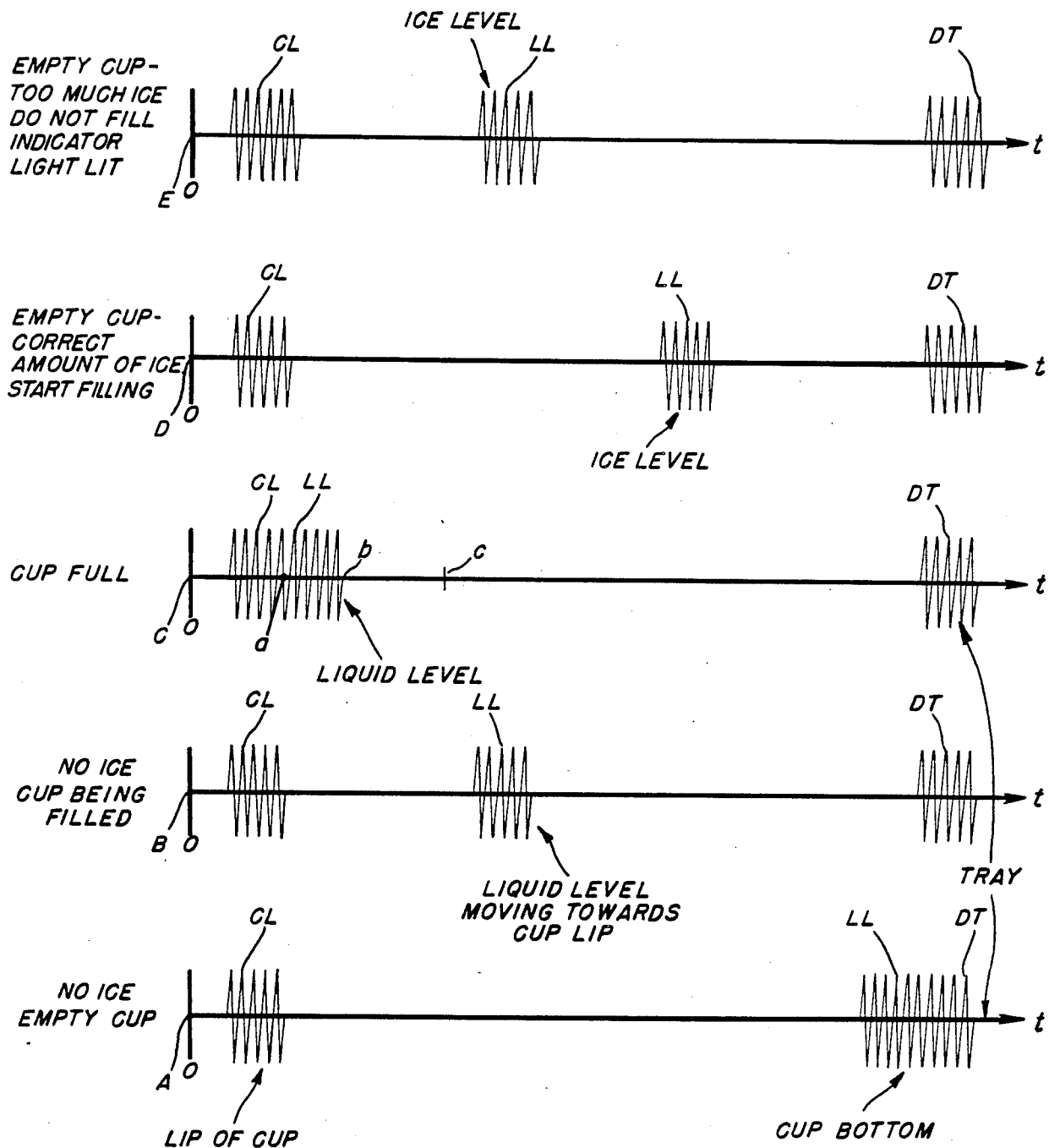
FIG. 8 is a timing diagram illustrating the waveforms of the ultrasonic wave energy reflected from the cup to be filled and its associated support surfaces and contents to illustrate the operation of the apparatus of the present invention.

The operation of the automatic filling apparatus of the present invention can be readily understood by reference to the timing diagram of FIG. 8, in conjunction with the flow charts of the software programmed into microprocessor 34, illustrated in FIGS. 9 to 16.

Referring to FIG. 8, the graphs A to E therein illustrate various conditions which might occur pursuant to the automatic filling of a cup with a post-mix beverage, as illustrated in FIG. 1. In viewing FIG. 8, it should be understood that time is plotted along the abscissa and amplitude of the reflected ultrasonic signals along the ordinate. The signals in FIG. 8 show waveshapes of reflected signals seen by transducer 26 prior to being processed into TTL logic levels by the circuitry of FIGS. 3 to 7. The microprocessor 34 sees square wave TTL signals positioned on the time axis at the same positions as the waveforms of FIG. 8. Graph A illustrates the nature of the reflected signals for an empty cup 24 supported on a drip tray 28 below a dispenser nozzle 22 in an ultrasonic transducer 26, such as illustrated in FIG. 1. The left-hand reference of the graph A, labeled 0, represents the point in time that a pulse is transmitted downwardly by ultrasonic transducer 26 in the configuration of FIG. 1 toward the cup 24. Therefore, all of the reflected pulses are referenced to the generation of an associated transmitted pulse along a time axis t. As can be seen by reference to graph A, the reflected ultrasonic pulse signal from the cup lip 24L is labeled CL, and it reaches ultrasonic transducer 26 much faster than a pulse reflected from the drip tray and the bottom of the cup. The drip tray or grate pulse is labeled DT, and the pulse reflected from the bottom of the cup is indicated LL in graph A; and as illustrated, they are adjacent since the drip tray surface and the cup bottom are closely juxtaposed. Thus, signal LL in this position indicates an empty cup.

As illustrated in graph B, as a cup 24 is being filled with liquid, what was the cup bottom pulse LL now becomes a liquid level pulse LL, which moves along the time axis of graph B depending on the liquid level within cup 24 at any point in time during the filling process. That is, the liquid level signal reflected from the interior of the cup moves closer and closer in time to signal CL, reflected from the cup lip, and further in time from signals reflected from the drip or grate pulse tray DT.

Referring to graph C, there is illustrated a full cup condition in which the liquid level pulse LL becomes contiguous to the cup lip pulse CL. Because these respective signals essentially merge, ringing between these signals can occur in the detector circuitry. Accordingly, in accordance with a preferred embodiment of the present invention, it is preferable to attempt to detect the leading edge of the cup lip signal CL labeled a and the trailing edge of the liquid level signal labeled b to avoid this ringing problem. This absence of a detectable trailing edge, a, of the lip signal, which would be the case in graph C, means that the cup is nearly full.

In accordance with another feature of the present invention, it is desirable to be able to topoff the filling operation of a carbonated beverage in the cup 24 after foam has dissipated. While filling cups 24 with carbonated beverage, it is well known that a head of foam will develop which will dissipate after a given period of time, leaving a cup less than full with liquid. In order to avoid this problem, when the transceiver circuitry of FIG. 2 and the associated microprocessor 34 detect the condition of reflected ultrasonic signals, as illustrated in graph C, this indicates that the cup 24 has been filled with liquid and generates a signal along control line C from microprocessor 34 to close the dispenser valves and stop the flow of liquid into the cup. If the liquid contains a head of foam, it will dissipate after a while so that the apparent liquid within the container will appear to subside to point c, as illustrated in graph C. Microprocessor 34 is programmed to recognize such a condition and reinitiate the flow of liquid by generating a valve open signal along line C to the dispenser controls 20C until the liquid level signal LL moves back into juxtaposition with the cup lip signal CL. When this occurs, the microprocessor will again sense this condition and generate a valve closing signal along control line C to dispenser controls 20C, stopping the filling operation and achieving a full condition. Accordingly, a full cup of beverage can be obtained, regardless of the formation of a head of foam thereon, according to the techniques of the present invention.

Referring to graphs D and E, there is illustrated the technique of the present invention for determining if there is too much ice within the cup 24 to initiate the filling operation. In graph D, there is an acceptable level of ice because, as can be seen from a time axis analysis, the level of ice illustrated by the liquid level signal LL is disposed less than halfway towards the cup bottom. In this situation, the logic within microprocessor 34 is programmed to automatically initiate the filling operation by generating an initiate pulse along line C to dispenser controls 20C, to open the appropriate valve associated with a dispenser nozzle 22. On the other hand, if the ice level is such that the signal LL occupies the position on the time axis illustrated in graph E, this signifies that the cup is more than half full of ice. Since this is undesirable, the logic programmed into microprocessor 34 will not generate and initiate a signal along line C to dispenser 20C and the filling operation cannot begin. Accordingly, the system of the present invention will not permit an operator to overload a cup with ice and provide a customer with less than a predetermined amount of liquid beverage.

The above described operations are implemented by the hardware described in connection with FIGS. 1 to 7 in conjunction with the software or programs illustrated by the flow charts of FIGS. 9 to 16, which are self-explanatory, but are generally described hereinafter.

ROUTINE DESCRIPTIONS

Main Routine

Figure 9:
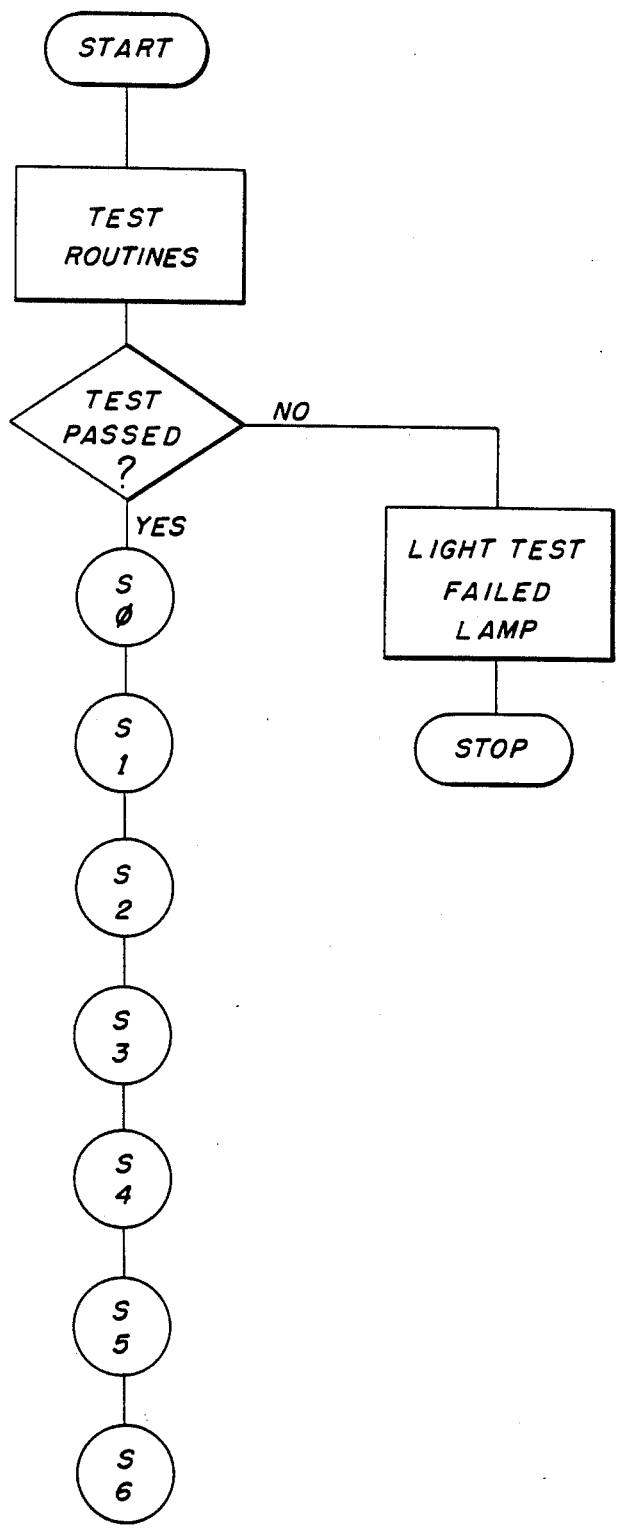
FIGS. 9 to 16 are flow charts illustrating the main routine and sub-routines of the software for operating the microprocessor 34 in the block diagram of FIG. 2.

The Main Routine illustrated in FIG. 9 is responsible for testing of the microcomputer system and transducers, and then directing control to the seven different states or subroutines S∅ to S6. Testing consists of the following:

Testing the random access memory by storing a known bit pattern and then reading the same pattern back.

Testing the read only memory by verifying the checksum.

Testing the transducers by initiating a pulse and receiving the grate level (Signal DT indicating the position of the drip tray 28).

Control functions are performed by calling the state that is selected. Each state is responsible for changing the state, to the next appropriate state, upon completion of its routine.

State∅—Detect Cup

Figure 10:
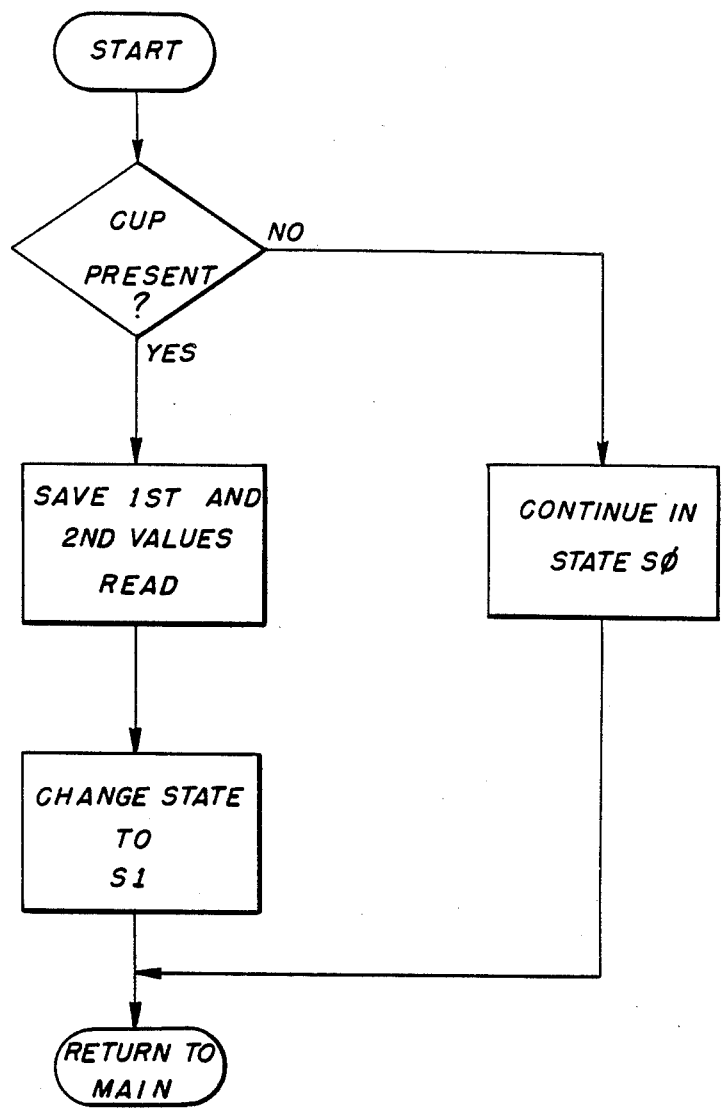

State ∅ (S∅) illustrated in FIG. 10 is responsible for detecting the presence of a cup. If a cup is detected, the state is changed to S1; otherwise, the state remains S∅. The first and second reflected signals read are saved for later reference. The first value should be the lip signal and the second value the ice level signal for a cup with ice therein.

State 1—Verify Cup and Ice Level

Figure 11:
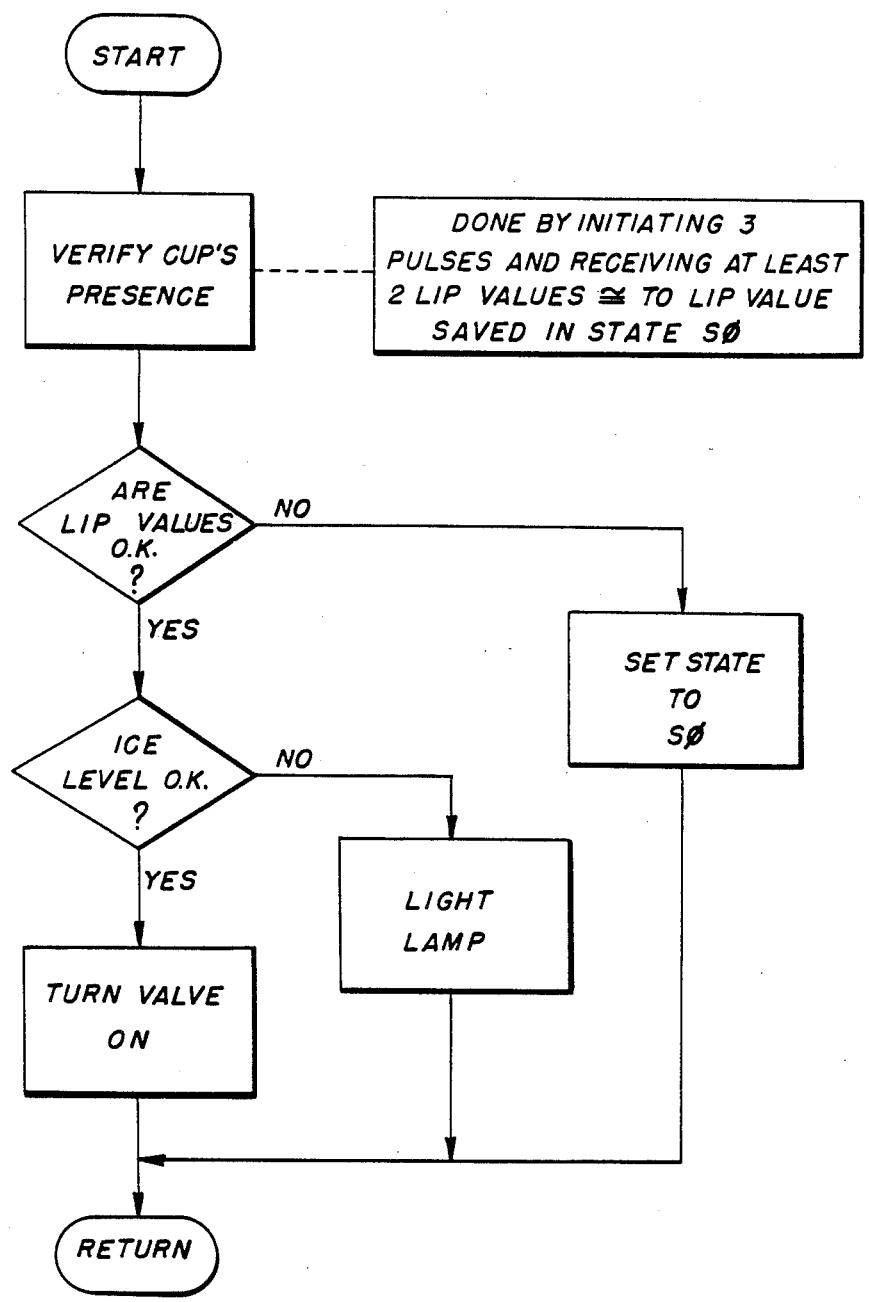

State 1 (S1) illustrated in FIG. 11 is responsible for verifying the cup's presence and checking the ice level. If the cup's presence is verified and the ice level is okay, then the valve is turned on and the state is set to S2. If the cup is not verified then the state is set to S∅. If the ice level is greater than allowed, a light indicating this will be lit. Cup presence verification is achieved by initiating a series of three ultrasonic pulses and detecting the receipt of at least 2 cup lip signals CL approximately equal to the lip value of CL saved in state S∅.

State 2—Start Filling

Figure 12:
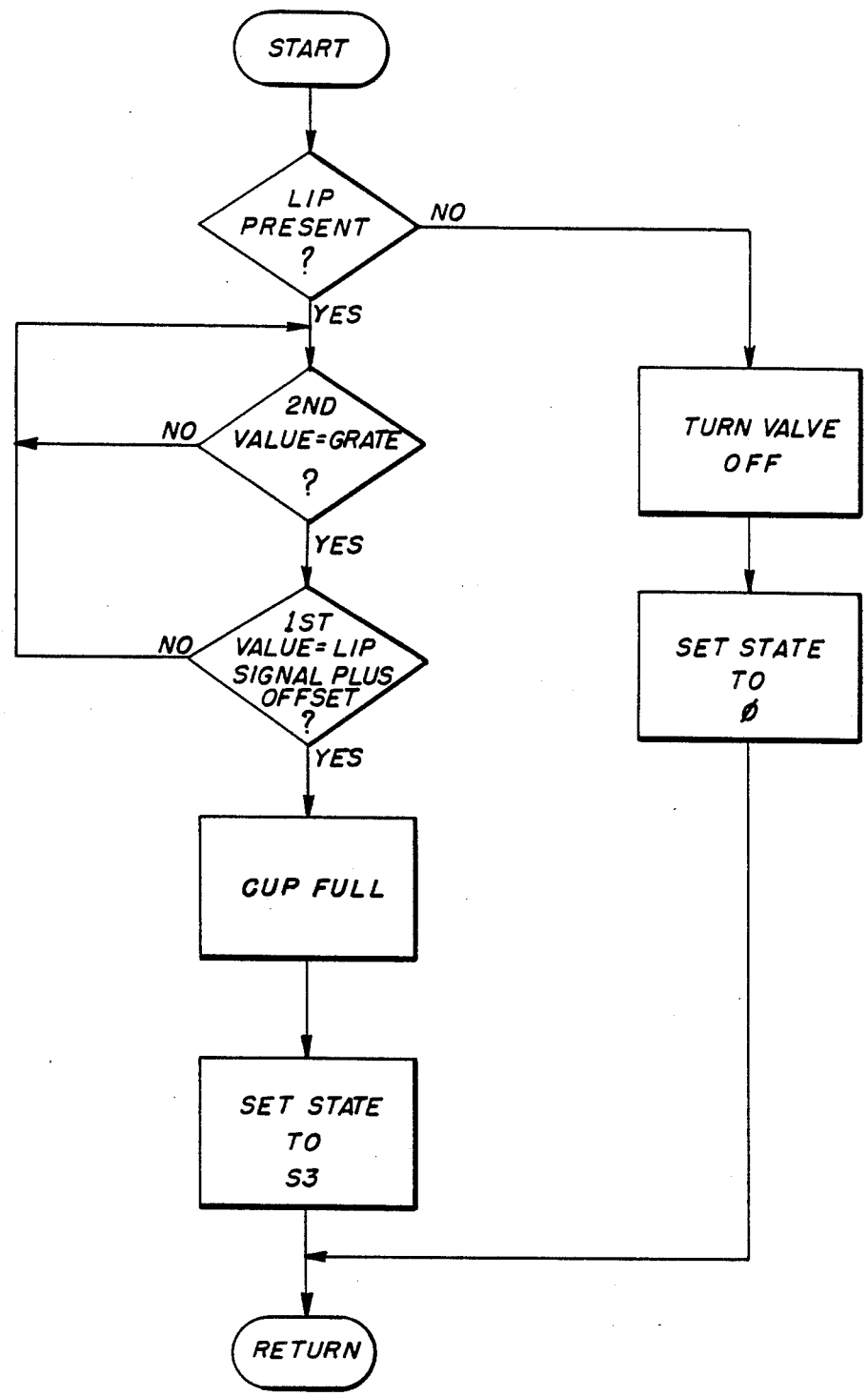

The routine performed in State 2 (S2) may best be understood by reference to the flow chart of FIG. 12 in conjunction with graphs A to C of FIG. 8. Graphs A to C show a filling operation from beginning to end as described hereinbefore. State 2 (S2) is responsible for the initial filling of the cup. As illustrated in the flow chart of FIG. 12, the microprocessor software first looks to see if a cup is present and, if so, state 2 (S2) proceeds. It then looks to see if the second value (second reflected pulse detected) is equal to the grate value DT (this condition is illustrated in graph A of FIG. 8). If so, it then looks to see if the first value detected is equal to the lip signal CL plus an offset. This condition is illustrated in graph C of FIG. 8. The offset (distance between a and b in graph C) is caused by the merging of the cup lip and the liquid level signals. When this condition is achieved, the cup is full and the software enters state 3 (S3).

State 3

Figure 13:
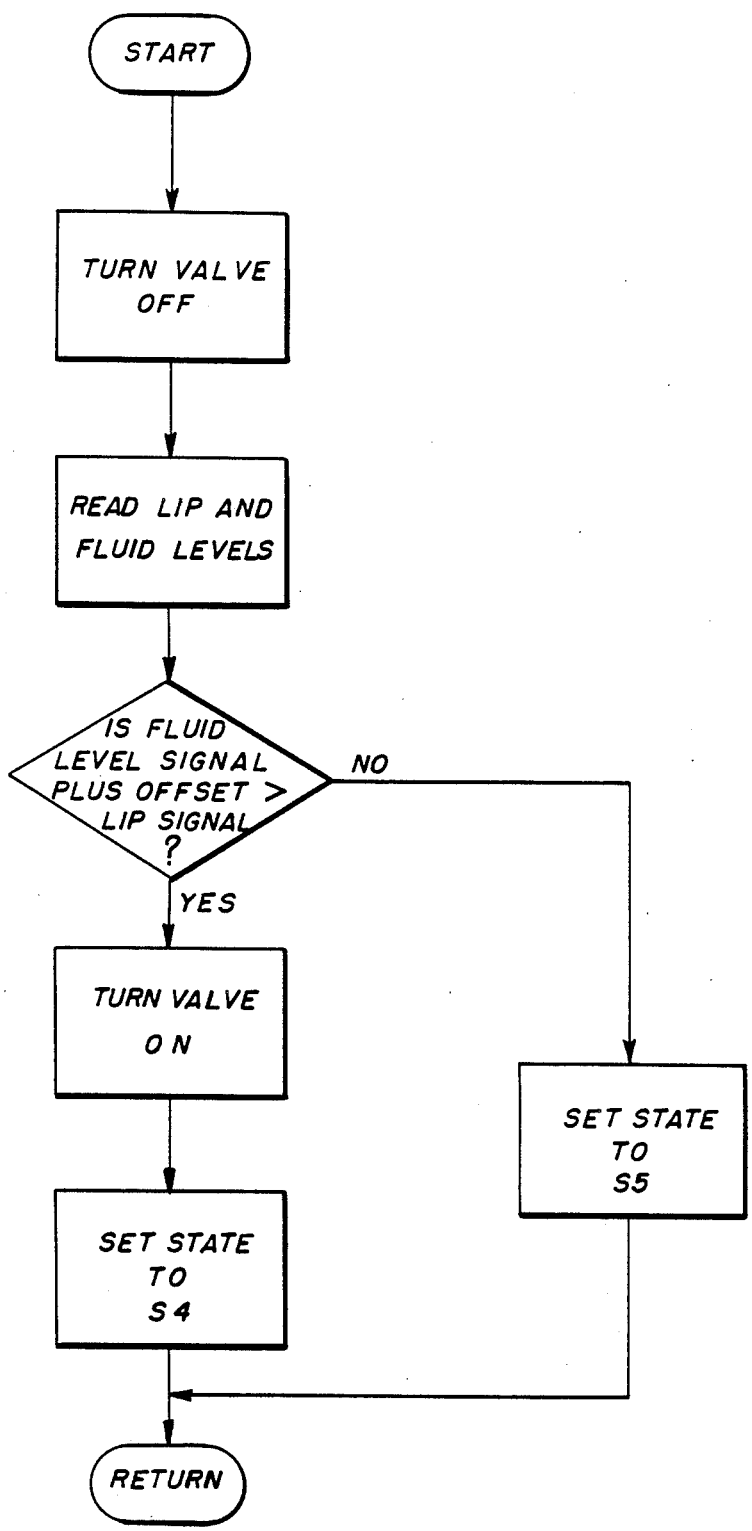

The State 3 (S3) subroutine illustrated in FIG. 13 is responsible for reinitiating the filling of a cup after the foam dissipates. As illustrated in graph C of FIG. 8, when foam dissipates the liquid level signal subsides, for example to point c. State 3 (S3) begins with the dispenser valve off. It then reads both the lip and liquid level signals and, if the liquid or fluid level signal plus the offset (caused by the merging of CL and LL in graph C) is greater than the lip signal CL, the dispenser valve is turned back on to complete the filling of the cup. The main routine then moves on to state 4 (S4).

State 4—Fill UP Cup

Figure 14:
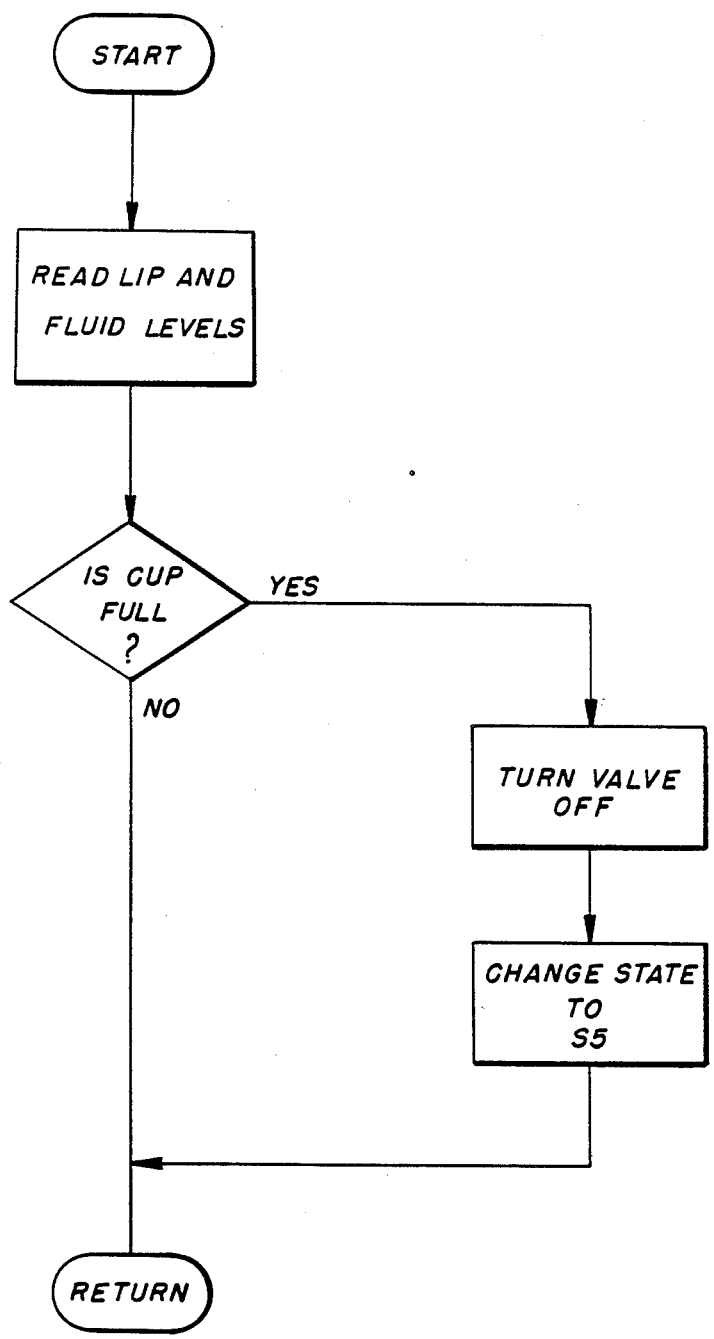

State 4 (S4) illustrated in FIG. 14 is responsible for finishing the filling that S3 was unable to complete. When the cup is determined full, the valve is turned off and the state is changed to S5.

State 5—Verify Cup Full

Figure 15:
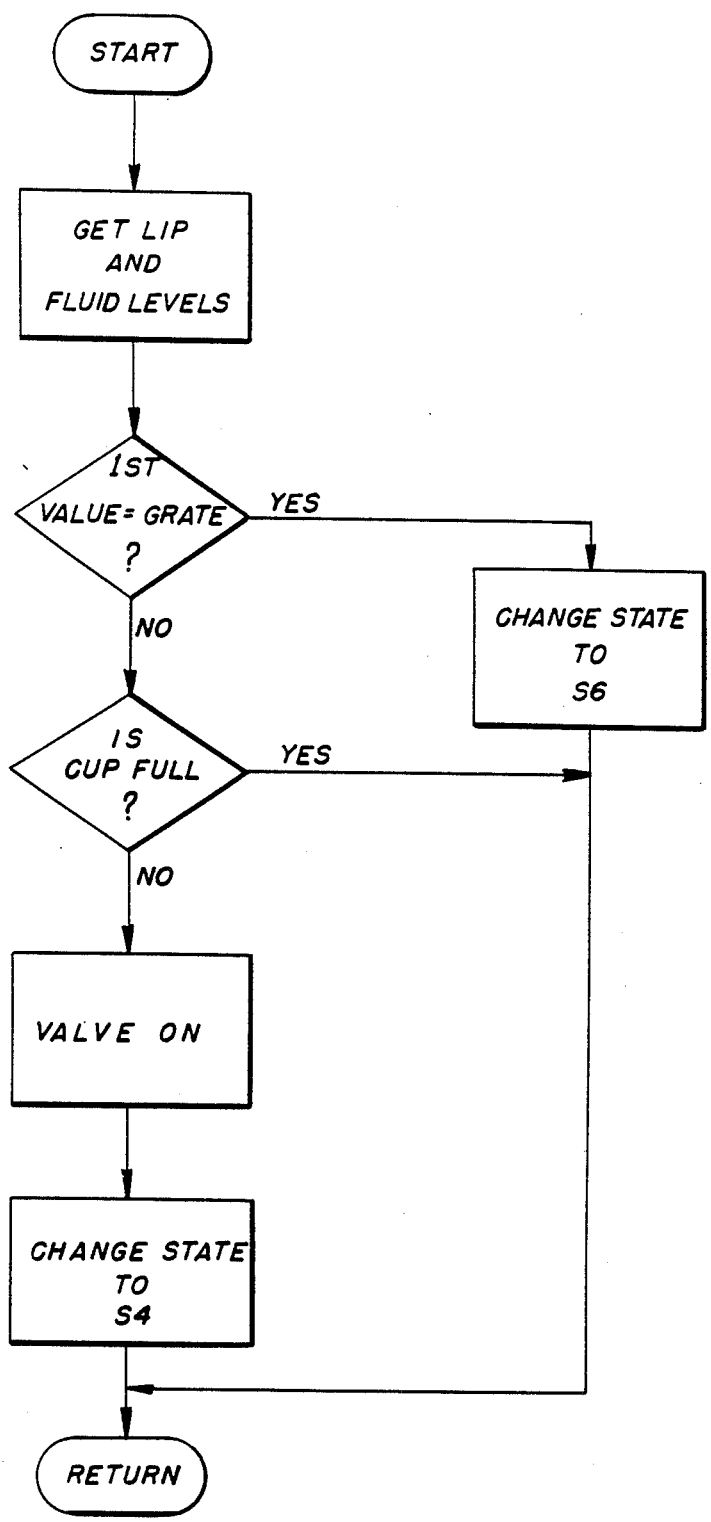

State 5 (S5) illustrated in FIG. 15 is responsible for ensuring that the cup is full after the foam settles and detecting the removal of the cup. If the cup is determined to need more fluid, then the valve is turned back on and the state is changed to S4. If the cup is not detected, the state is changed to S6. If the cup is full and is detected, then the state is unchanged.

State 6—Cup Removal

Figure 16:
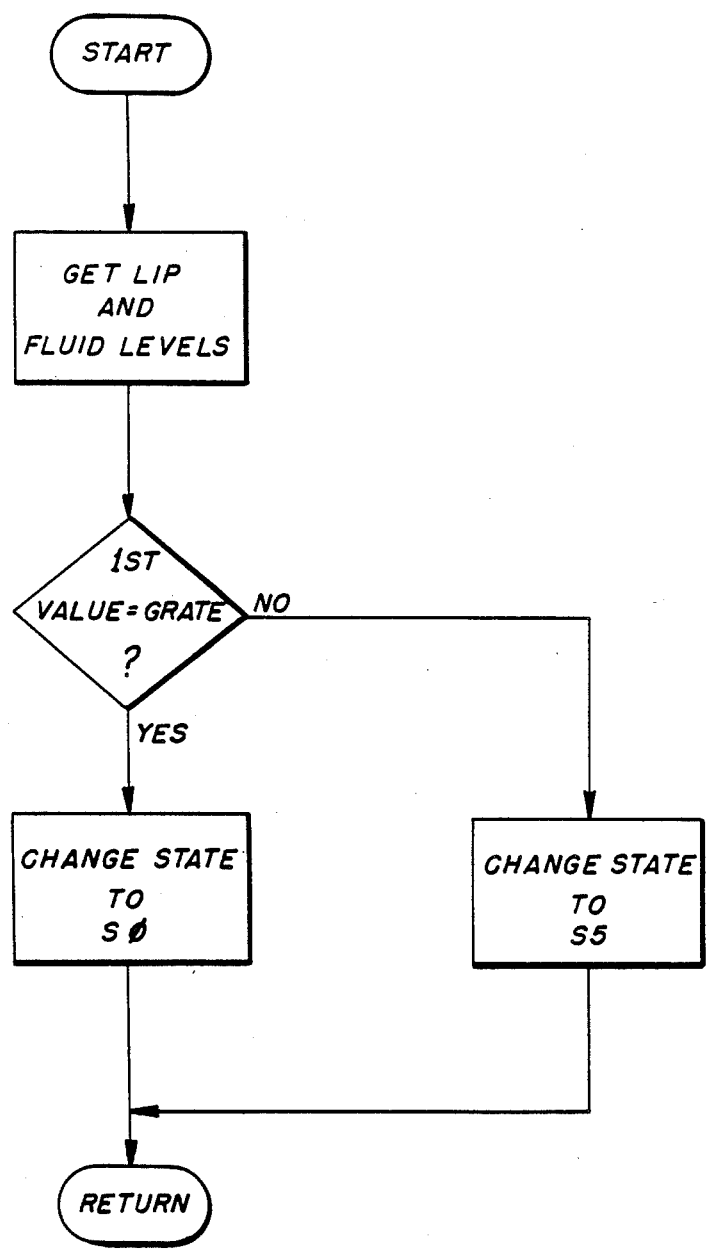

State 6 (S6) illustrated in FIG. 16 is responsible for verifying removal of the cup. If the grate level is detected, then the state is changed to S∅; otherwise, the state is changed to S5 to ensure that the cup is full.

It should be understood that the above-described system may be modified, as would occur to one of ordinary skill in the art without departing from the spirit and scope of the present invention.

What is claimed is:

1. An apparatus for automatically filling a container with a carbonated beverage which tends to form a head of foam during said filling, comprising:
   a dispenser outlet for directing the flow of carbonated beverage into an opening in the top of the container, said opening being defined by a surrounding container lip;
   valve means for initiating the flow of said carbonated beverage to said dispenser outlet when open and stopping the flow thereto when closed;
   detector means for measuring the level of carbonated beverage in said container;
   first control means responsive to said detector means for closing said valve means to stop the flow of carbonated beverage to said dispenser outlet when said carbonated beverage reaches a predetermined level in said container;
   means for opening said valve means to reinitiate the flow of said carbonated beverage if said level of beverage subsides following the closing of said valve means by said first control means by more than a predetermined distance, caused by dissipation of said head of foam; and
   second control means for closing said valve means when said level reaches a predetermined distance from said container lip.

2. The apparatus of claim 1, wherein said detector means comprises:
   ultrasonic means for transmitting ultrasonic wave energy toward said container lip and the interior of said container; and
   ultrasonic detector means for receiving ultrasonic wave energy reflected from said container lip and said liquid therein and generating a container lip signal and a liquid level signal, each having a leading and trailing edge with respect to time.

3. The apparatus of claim 2, further comprising:
   third control means responsive to the trailing edge of said lip signal and the trailing edge of said liquid level signal for generating a stop signal to close said valve means when the trailing edge of said lip signal is absent and the trailing edge of said liquid level signal is present.

4. The apparatus according to claim 1, wherein said detector means includes ultrasonic means for transmitting ultrasonic wave energy toward said container lip and the container bottom, ultrasonic detector means for receiving ultrasonic wave energy reflected from said container lip for generating a series of lip signals and further comprising:
   logic circuit means for generating a signal indicative of the presence of a container only when a predetermined number of said lip signals in said series are at substantially the same level; and
   third control means responsive to said signal generated by said logic circuit means for opening said valve means to initiate said flow of liquid.

5. The apparatus of claim 2, further including a given level of ice in said container and wherein said ultrasonic detector means also receives ultrasonic energy reflected from said ice to generate an ice level signal;
   means for determining said given level of ice from said ice level signal; and
   means for precluding the opening of said valve means to initiate said flow if said given ice level exceeds a predetermined limit.

6. The apparatus of claim 4, further including a given level of ice in said container and wherein said ultrasonic detector means also receives ultrasonic energy reflected from said ice to generate an ice level signal;
   means for determining said given level of ice from said ice level signal; and
   means for precluding the opening of said valve means to initiate said flow if said given ice level exceeds a predetermined limit.

7. An apparatus for automatically filling a container with a liquid comprising:
   a dispenser outlet for directing the flow of said liquid into an opening at the top of the container, said opening being defined by a surrounding container lip;
   valve means for initiating the flow of said liquid to said dispenser outlet when open and stopping the flow thereto when closed;

ultrasonic means for transmitting ultrasonic wave energy toward said container lip and the interior of said container;

ultrasonic detector means for receiving ultrasonic wave energy reflected from said container lip and said liquid therein and generating a container lip signal and a liquid level signal, each having a leading and trailing edge with respect to time; and control means responsive to the trailing edge of said lip signal and the trailing edge of said liquid level signal for generating a stop signal to close said valve means when the trailing edge of said lip signal is absent and the trailing edge of said liquid level signal is present, whereby the absence of the trailing edge of said lip signal and the presence of the trailing edge of said liquid level signal indicate that said container is full of liquid.

8. An apparatus for automatically filling a container with a liquid, comprising:

a dispenser outlet for directing the flow of liquid into an opening at the top of the container, said opening being defined by a surrounding container lip;

ultrasonic means for transmitting ultrasonic wave energy toward said container lip and the container bottom;

ultrasonic detector means for receiving ultrasonic wave energy reflected from said container lip for generating a series of lip signals;

circuit means for generating a signal indicative of the presence of a container only when a predetermined number of lip signals in said series are at substantially the same level;

valve means for initiating the flow of said liquid to said dispenser outlet when open and stopping the flow therein when closed; and control means responsive to said signal generated by said circuit means for opening said valve means to initiate said flow of liquid, whereby spurious, non-repetitive signals cannot be interpreted as a lip signal and the presence of a container.

9. An apparatus for automatically filling a container with a beverage, said container having ice therein, comprising:

a dispenser outlet for directing the flow of beverage into an opening in the top of the container, said opening being defined by a surrounding container lip;

valve means for initiating the flow of said beverage to said dispenser outlet when open and stopping the flow thereto when closed;

ultrasonic means for transmitting ultrasonic energy through said opening toward the ice therein;

detector means for measuring ultrasonic energy reflected from said ice and determining said given level thereof; and control means for precluding the opening of said valve means to initiate said flow if said given ice level exceeds a predetermined limit.

10. An apparatus for automatically filling a container having a given level of ice therein with a beverage comprising:

a dispenser outlet for directing the flow of liquid into an opening at the top of the container, said opening being defined by a surrounding container lip;

ultrasonic means for transmitting ultrasonic wave energy toward said container lip and the container bottom;

ultrasonic detector means for receiving ultrasonic wave energy reflected from said container lip and said ice therein for generating a series of lip signals and an ice level signal;

logic circuit means for generating a signal indicative of the presence of a container only when a predetermined number of lip signals in said series are at substantially the same level;

valve means for initiating the flow of said liquid to said dispenser outlet when open and stopping the flow thereon when closed; and control means responsive to said signal generated by said logic circuit means and said ice level signal for opening said valve means to initiate said flow of liquid when said given ice level is below a predetermined limit.

11. An apparatus for automatically filling a container having a given level of ice therein with a carbonated beverage which tends to form a head of foam during said filling, comprising:

a dispenser outlet for directing the flow of liquid into an opening at the top of the container, said opening being defined by a surrounding container lip;

ultrasonic means for transmitting ultrasonic wave energy toward said container lip and the container bottom;

ultrasonic detector means for receiving ultrasonic wave energy reflected from said container lip, said ice therein and said carbonated beverage for generating a series of lip signals, an ice level signal and liquid level signal, respectively;

logic circuit means for generating a signal indicative of the presence of a container only when a predetermined number of lip signals in said series are at substantially the same level;

valve means for initiating the flow of said liquid to said dispenser outlet when open and stopping the flow thereto when closed;

first control means responsive to said signal generated by said logic circuit means and said ice level signal for opening said valve means to initiate said flow of liquid when said given ice level is below a predetermined limit;

second control means responsive to said liquid level signal for closing said valve means to stop the flow of carbonated beverage to said dispenser outlet when said carbonated beverage reaches a predetermined level in said container;

means for opening said valve means to reinitiate the flow of said carbonated beverage if said level of carbonated beverage subsides following the closing of said valve means by said control means by more than a predetermined distance, caused by dissipation of said head of foam; and third control means for closing said valve means when said liquid level reaches a predetermined distance from said container lip.

12. The apparatus of claim 11, wherein each lip signal and liquid level signal have a leading and trailing edge with respect to time and said apparatus further comprises:

fourth control means responsive to the trailing edge of said lip signal and the trailing edge of said liquid level signal for generating a stop signal to close said valve means when the trailing edge of said lip signal is absent and the trailing edge of said liquid level signal is present.

13. A method for automatically filling a container with a carbonated beverage which tends to form a head of foam during said filling, comprising the steps of:

initiating the flow of said carbonated beverage into an opening in the top of the container, said opening being defined by a surrounding container lip;

measuring the level of carbonated beverage flowing into said container;

stopping the flow of carbonated beverage into said container when said carbonated beverage reaches a predetermined level therein;

reinitiating the flow of said carbonated beverage at a selected time following the stopping of said flow to permit said head of foam to dissipate; and restopping the flow of carbonated beverage when the level therein reaches a predetermined distance from said container lip.

14. A method for automatically filling a container having a given level of ice therein with a carbonated beverage which tends to form a head of foam during said filling, comprising the steps of:

transmitting ultrasonic wave energy toward the top of the container and through an opening therein toward the container bottom;

measuring ultrasonic wave energy reflected from said container top, said ice therein and said carbonated beverage for generating container lip signals, an ice level signal and a liquid level signal, respectively;

initiating the flow of said carbonated beverage into said container only in the presence of a lip signal, and an ice signal indicative of a level of ice below a predetermined limit;

stopping the flow of carbonated beverage to said container when the carbonated beverage in said container reaches a predetermined level therein;

reinitiating the flow of said carbonated beverage at a selected time following the stopping of said flow to permit said head of foam to dissipate; and restopping the flow when said liquid level reaches a predetermined distance from the top of said container.

* * * * *